US008086507B1

(12) United States Patent
Alder

(10) Patent No.: US 8,086,507 B1
(45) Date of Patent: Dec. 27, 2011

(54) METHOD FOR ADMINISTERING FINANCES VIA AN ELECTRONIC NETWORK

(76) Inventor: Lawrence John Alder, Mountain View, CA (US)

( * ) Notice: Subject to any disclaimer, the term of this patent is extended or adjusted under 35 U.S.C. 154(b) by 498 days.

(21) Appl. No.: 12/177,806

(22) Filed: Jul. 22, 2008

(51) Int. Cl.
*G06Q 10/00* (2006.01)

(52) U.S. Cl. ............. 705/30; 705/38; 705/35; 705/36 R; 705/37; 705/42

(58) Field of Classification Search ............ 705/38, 705/39
See application file for complete search history.

(56) References Cited

U.S. PATENT DOCUMENTS

| 5,953,710 | A * | 9/1999 | Fleming | 705/38 |
| 7,343,335 | B1  | 3/2008 | Olliphant | |
| 2002/0169640 | A1 * | 11/2002 | Freeland | 705/4 |
| 2003/0097331 | A1 * | 5/2003 | Cohen | 705/39 |
| 2005/0077350 | A1 * | 4/2005 | Courtion et al. | 235/380 |

* cited by examiner

*Primary Examiner* — Ryan Zeender
*Assistant Examiner* — Denisse Ortiz Roman

(57) ABSTRACT

The present invention provides a method of administering finances via an electronic network. The administrator creates accounts for users that the administrator wants to oversee. The administrator can supply financial parameters to configure the accounts where such financial parameters might include the amount of a recurring weekly allowance payment, an account interest rate, a list of investment instruments that the user would be allowed to transact with. The administrator is able to set interest rates and other financial parameters at their discretion and not subject to prevailing market conditions. The system automatically updates the account to keep track of allowance and interest payments. The system allows the users and administrator to record financial transactions and keep track of and view the user's balance and holdings.

15 Claims, 14 Drawing Sheets

METHOD FOR ADMINISTERING FINANCES VIA AN ELECTRONIC NETWORK

FIELD OF THE INVENTION

The present invention relates to financial management and, more particularly, to administering finances via an electronic network.

BACKGROUND OF THE INVENTION

One of the responsibilities of being a parent is to help kids learn about the management of money. Parents often pay children weekly or monthly allowances or pay children for work in order to give the children experience with money. However, simply giving children money to spend has limitations in the ability to teach them about how money is used and managed. First, it is hard for kids to track how much money they were paid and what they spent it on so they often forget and don't really appreciate or learn about money management. Second, parents often forget to pay the allowances creating confusion as to if and when they were actually paid since there is no record of the transaction. Third, keeping all your money in cash is not representative of how adults typically hold their assets. Additionally, the kids don't learn about real world incentives such as interest on their saved money.

There have been two common ways that parents have solved the problem of simply using cash: log book, commercial bank account. In the log book method, the parents often hold the funds but keep a log book similar to a bank passbook keeping track of credit for payments such as allowance owed to the child or deductions for items the child spent the money on. This method solves the problem of tracking where the money came and went and making sure allowance is actually paid every week or month. However, the disadvantage of this method is that it is difficult to provide the child interest on the money saved without difficult manual calculations.

In order to provide the child with interest, some parents opt for a commercial bank account to manage the child's money. This will provide an actual interest rate. But that rate is set by the bank and not the parent. Often, kids do not have much money saved and bank interest rates on savings account can be very low such as 3% or less. This means if a child has say less than one hundred dollars saved the child would only earn about 25 cents a month in interest. This might not really be enough to generate the incentive a parent would like to see for a child to save. Clearly, it would be better if the parent could set and control the interest rate.

Beyond interest parents might also like to teach their children about investing in bonds and stocks in a safe and controlled environment.

It would thus be advantageous to provide a method for a parent to administer a child's finances. It would be advantageous if this method allowed access to the financial information over an electronic network, such as the internet, and the administrator can set unique account login credentials for themselves and the user. It would further be advantageous if that method allowed the administrator to set the accounts financial parameters such as interest rate, allowance amount, dates when allowance should be recorded, and other financial parameters potentially including investment instruments such as stocks, bonds, and mutual funds that the child may buy and sell. It would further be advantageous if that method tracked transactions, automatically recorded recurring payments such as allowance, automatically computed interest, calculated current account balance, value of other holdings and kept a history of transactions.

SUMMARY OF THE INVENTION

In accordance with the present invention, there is provided a method to administer finances via an electronic network. A private party administrator creates accounts for users that the administrator wants to oversee. Users are able to access accounts and execute transactions while administrators can both access and administer the account.

The administrator can supply financial parameters to configure the accounts where such parameters might include the amount of a recurring allowance payment, the interval of the recurring allowance payment, an account interest rate, a list of investment instruments that the user would be allowed to transact with. The administrator is not constrained by market interest rates or commercial investment instruments but can set their own based on their goals for the account they are administering.

One embodiment of the invention provides a web based solution that allows administrators and users to execute and track transactions. Account balances, interest rates and other automated transactions are computed and stored for later review.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DETAILED DESCRIPTION OF THE PRESENT INVENTION

Figure 1:
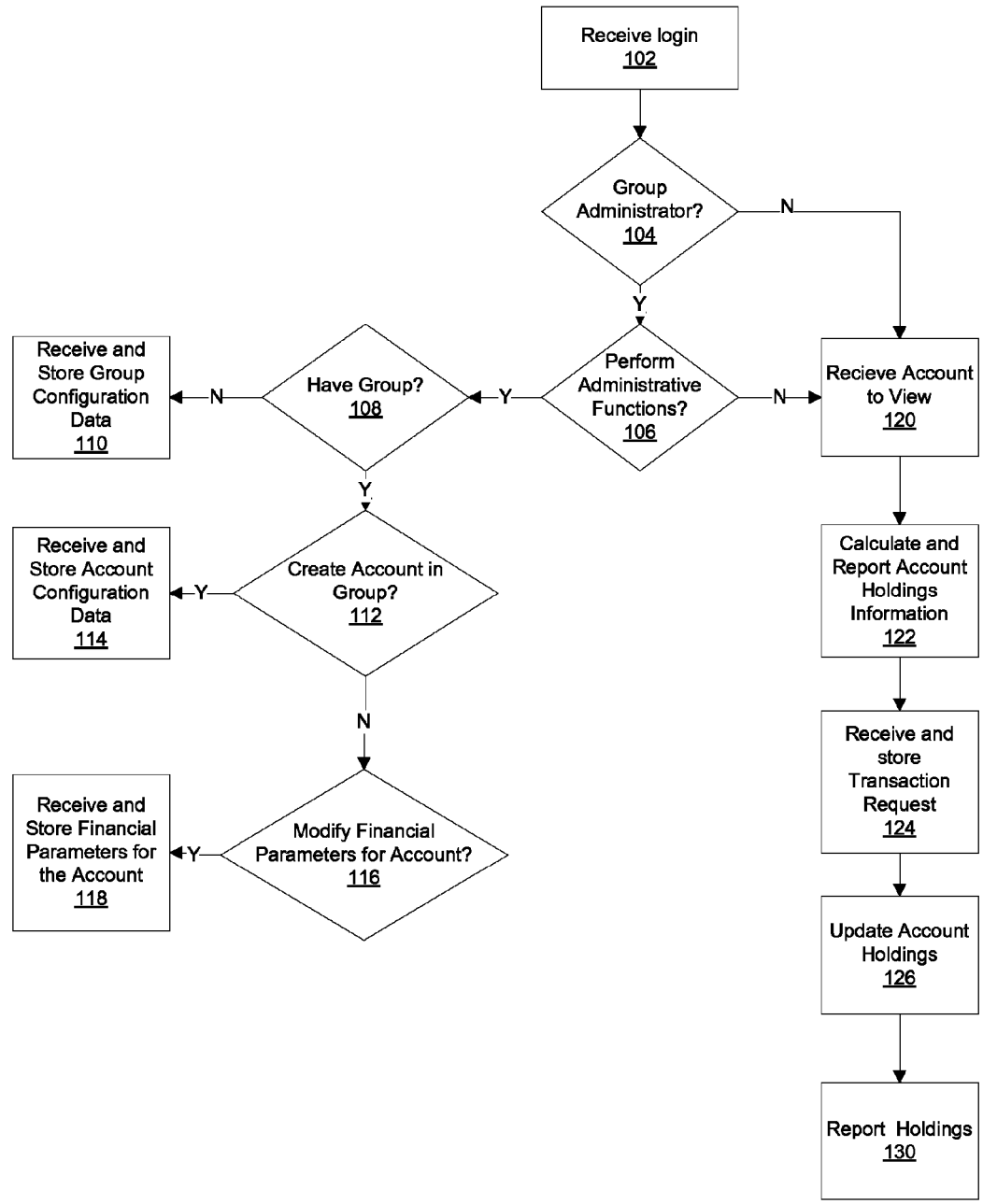
FIG. 1 is a general block diagram which illustrates the method for administering finances in accordance with an embodiment of the present invention.

FIG. 1 shows a general block diagram which illustrates the method for administering finances in accordance with an embodiment of the present invention. The method is initiated by a receiving a login request (step 102). For ease of explanation, the individual or entity that that sends the login request will be called a client. The clients are classified as into types: administrators and users. Administrators setup and administer the accounts for users. For example, an administrator may be a parent and a user one of their children.

It is an important aspect of this invention that the administrator is a type of client. The administrator is a private party client not required to be affiliated with a financial institution, a servicer provider, or a business of any kind. Although it is not required, typically an administrator is someone who is a guardian and has financial responsibility for the user such as a parent.

If the client is an administrator as determined by the login (step 104), the client may choose to perform administrative functions (step 106). If the administrator does not have a group already in existence (step 108), the administrator will be prompted such as via a web page to provide group configuration information that includes group name, administrator's login credentials (username, password). Upon receiving the group configuration data, the information is stored (step 110) and the group is thus created.

If an administrator had previously created a group (step 108), the administrator will have the option to create an account (step 112). The administrator will be prompted such as via a web page to provide account configuration information that includes username for the account user, and password for the account. Upon receiving the account configuration data, the account information is stored (step 114) and the account is thus created and recorded as an account in this group.

For any accounts the administrator has created in the group, the administrator has the option to modify the financial parameters associated with the account (step 116). The administrator will be prompted such as via a web page to provide financial parameters for the account. Those financial parameters may include an allowance amount, the interval of the recurring allowance payment such as weekly or monthly, an account interest rate, a list of investment instruments that the user would be allowed to transact with. Upon receiving the financial parameters for the account (Step 118), the financial parameters are stored to be used later in updating the account holdings. The administrator may have multiple accounts in the group and each account may have different financial parameters.

It is an important feature of the invention that an administrator, being a private party client who has no affiliation with a financial institution or service provider, has control over the financial parameters of the account such as allowance amount and interest rate, and is free to set them at the administrator's discretion without being constrained by prevailing market conditions. With a typical bank or brokerage account it is the financial institution not the client that has control over the financial parameters. This invention enables private party administrators to set the financial parameters for the accounts they create.

Figure 17:
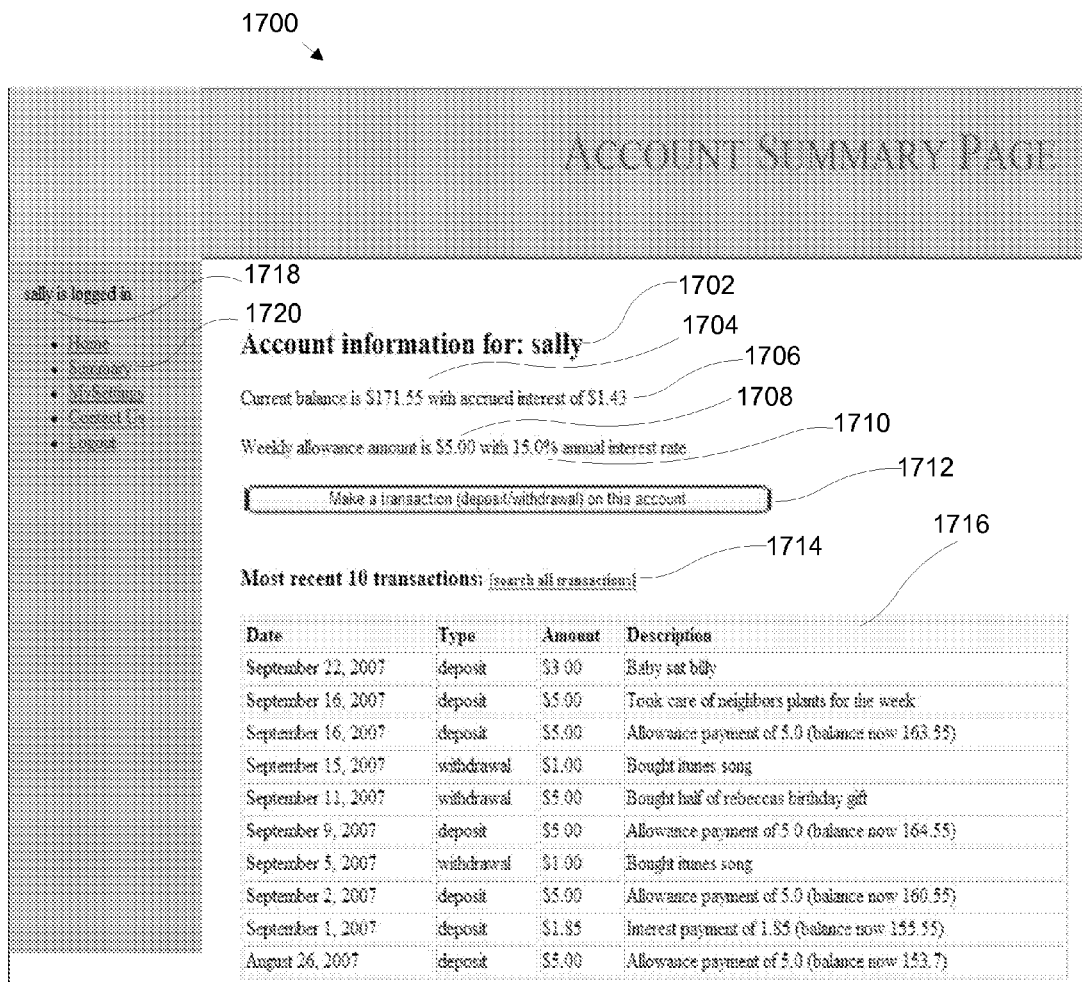
FIG. 17 is an illustration of a graphical user interface of an "Account Summary Page" used in accordance with an embodiment of the present invention.

If the client is not an administrator as determined by the login (step 104) or is an administrator not choosing administrative functions (step 106), the client may select an account to view (step 120). If the user has only one account that account maybe selected as default by the login, if the client has multiple accounts such as maybe common for an administrator, the client will prompted to choose which account to view. Upon receiving the account to view (step 120), the account is updated (step 122). During this step, the system records any automated transactions such as allowance payments or interest payments that may have occurred since the last time the account was viewed. The system then computes the current balance and holdings to reflect all the transactions to date. As part of this step, the account balance and holdings and possibly recent transactions may be sent to the client for viewing as a web page that will also prompt the client to make a transaction an embodiment of such a web page is shown in FIG. 17. It is an important aspect of this invention that recurring transactions such as allowance transactions are automatically recorded and thus free administrators who are often parents having to remember every week to pay allowance and thus solving the age old family problem of children asking for their weekly allowance more than once.

Once the client views the account holdings, they will be promoted to make a transaction. The most basic transactions are deposit or withdrawal. For a deposit, the client is recording that fact that money was deposited into the account. This usually means that the user gave the administrator some money to hold or that the administrator is recording a payment from the administrator to the user such as payment for chores or even birthday money. For withdrawal, the client is recording the fact that money was spent from the account. Typically, a withdrawal is recorded when the administrator gives cash to the user or gives to cash to someone on behalf of the user. For example, if the user wants to buy an ice-cream and the administrator purchases the ice-cream but later records the withdrawal. The transaction information includes an amount as well as an optional description of the transaction.

In addition to deposit and withdrawal transactions, the method can enable more complex transactions such as buy and sell. For example, the administrator may configure the financial parameters (step 118) to allow the user to purchase investment instruments that track investment vehicles such as stocks whose market value is quoted on exchanges and whose current value can be found on web sites such as Google finance (http://finance.google.com/finance). For purposes of clarity, the investment "instrument" is defined as what the user is purchasing. The investment "vehicle" here is an actual security (such as a stock or bond) or index fund that is not being purchased on the commercial market or exchange but whose commercial value as publically quoted is being used to set the value of the instrument "instrument". One can say the investment "instrument" the user is buying is configured to track the underlying commercial investment "vehicle". For example, an administrator may allow the user to buy investment instruments that track the value of a stock with symbol such as GOOG whose value is quoted on the NASDAQ Stock Exchange. As additional example, the investment instrument may track the value of an exchange traded fund or mutual fund. The administrator via the financial parameters is able to configure what investment instruments are available to the user. For example, the administrator may decide to only make investment instruments that track index funds available for the user to transact with. The system may allow users to buy fractions of shares of investment instruments as well which gives users the ability to transact small dollar amounts than they might be able to on commercial markets.

When a user buys an investment instrument the amount of the transaction is deducted from the cash balance and the quantity is recorded has held in the account as a holding. The quantity may be for example number of shares purchased. The value of the holding can be based on the market value of the investment vehicle. When an instrument is sold, the value of the sale is set by the current market value of the underlying investment vehicle and the number of shares held and that transaction amount is added back to the cash balance of the account.

In addition to investment vehicles that are tracked on commercial markets or exchanges, the administrator maybe able to create custom investment instruments such as fixed income securities for the user to buy and/or sell. As an example, the administrator may configure the financial parameters (step 118) to allow the user to buy a bond for a fixed price that pays out at a different amount at some defined point in the future. The specifics of the bond such as price, duration and coupon payments may be set as financial parameters (step 118). This allows the administrator to create investment instruments with payments and interest rates that might be appropriate for the age of the user and the goals of the administrator may have to teach user about money. It is again an important and innovative aspect of this invention that the administrator is free to create the definition of the investment instrument based on the goals of the administrator and not subject to prevailing financial market conditions.

Upon receiving the transaction request (step 124), the transaction is stored. The account is then updated (step 126) such that the balance and holdings of the account reflect that transaction. Once the account is updated, the holdings of the account are reported back to the user (step 130) usually in the form of a web page.

Figure 2:
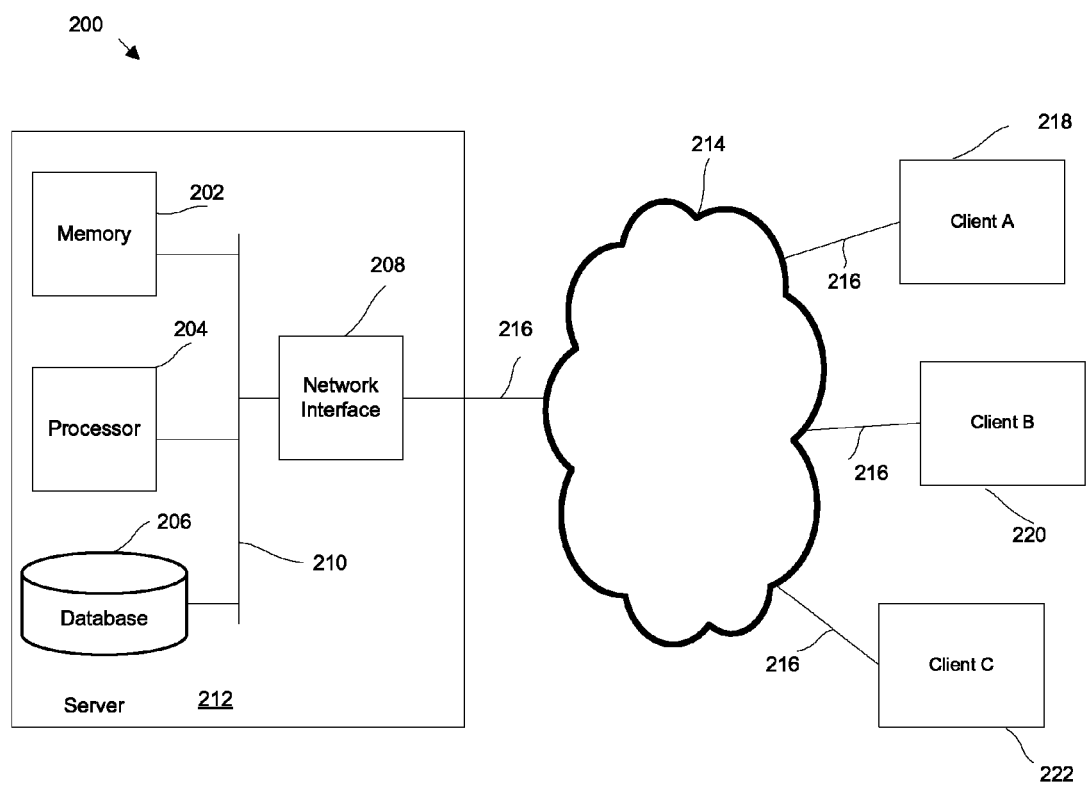
FIG. 2 is a diagrammatic view of an electronic network for administering finances in accordance with an embodiment of the present invention.

FIG. 2 is a diagrammatic view of an electronic network 200 for administering finances in accordance with an embodiment of the present invention. Network 200 maybe interconnected with other networks and maybe embodied by ways including a local area network (LAN), wide area network (WAN), or a global network (the Internet). The Network 200 connects clients 218 to 222 and at least one server 212. A client here is defined as an individual such as an administrator or user using some form of compute device. For illustrative purposes only, three clients are shown. In one embodiment, the clients interact with the server using web browsers such as Mozilla Firefox. The web browsers communicate with the server using the Hypertext Transmission Protocol (HTTP). The clients navigate to the server by using a uniform resource locator (URL).

The server 212 and the client computing device 218-222 connection is made via a communication network 214 which may comprise of the Internet or an intranet. The connection to the communication network 214 is made via communication links 216 such as wire, cable or wireless. The server 212 contains at least one processor 204, memory 202, database 206, a network interface 208, and communications bus 210 that connects these elements.

The server memory 202 contains an operating system such as Linux along with a software environment such as Apache to respond to client requests such as HTTP requests. The requests from the client are processed by the server 212 and the server 212 returns responses which may be in the form of HTTP and may include web pages using Hypertext Markup Language (HTML), Extensible Markup Language (XML) or other web based protocols such as Java. The processor 204 may interface with the database using software such as MySQL.

Figure 3:
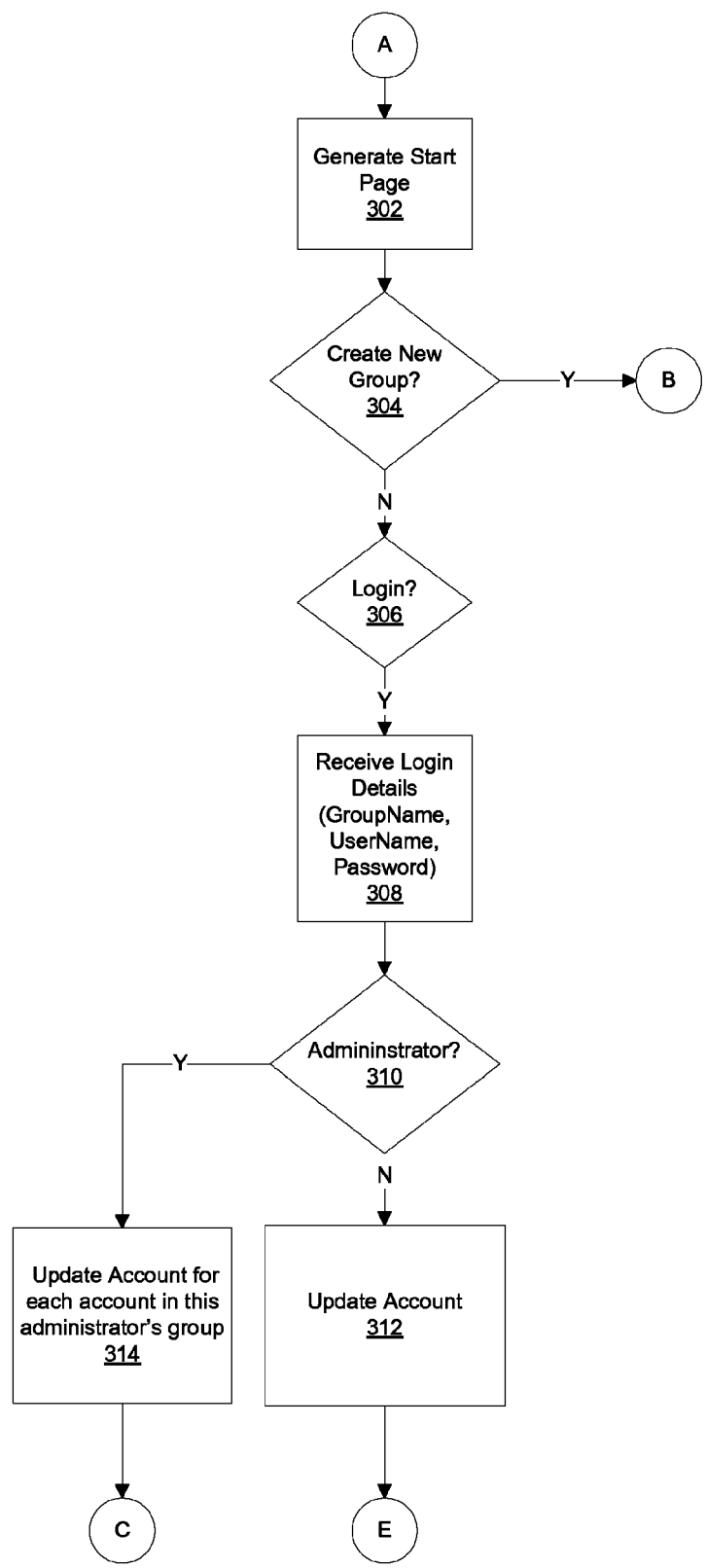
FIG. 3 is a more detailed flow chart of the method for an embodiment of the present invention.
Figure 11:
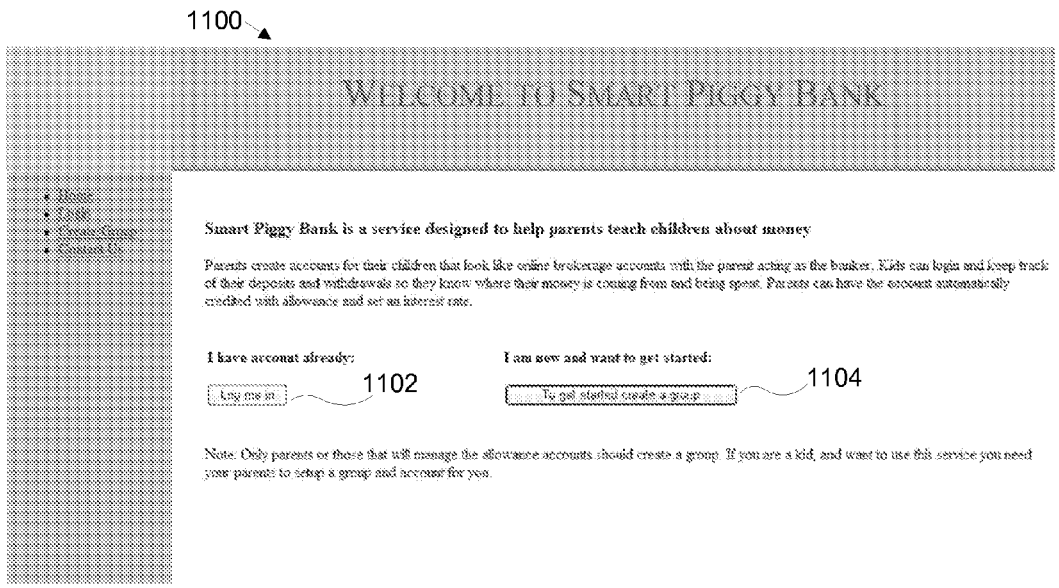
FIG. 11 is an illustration of a graphical user interface of a "Start Page" used in accordance with an embodiment of the present invention.
Figure 12:
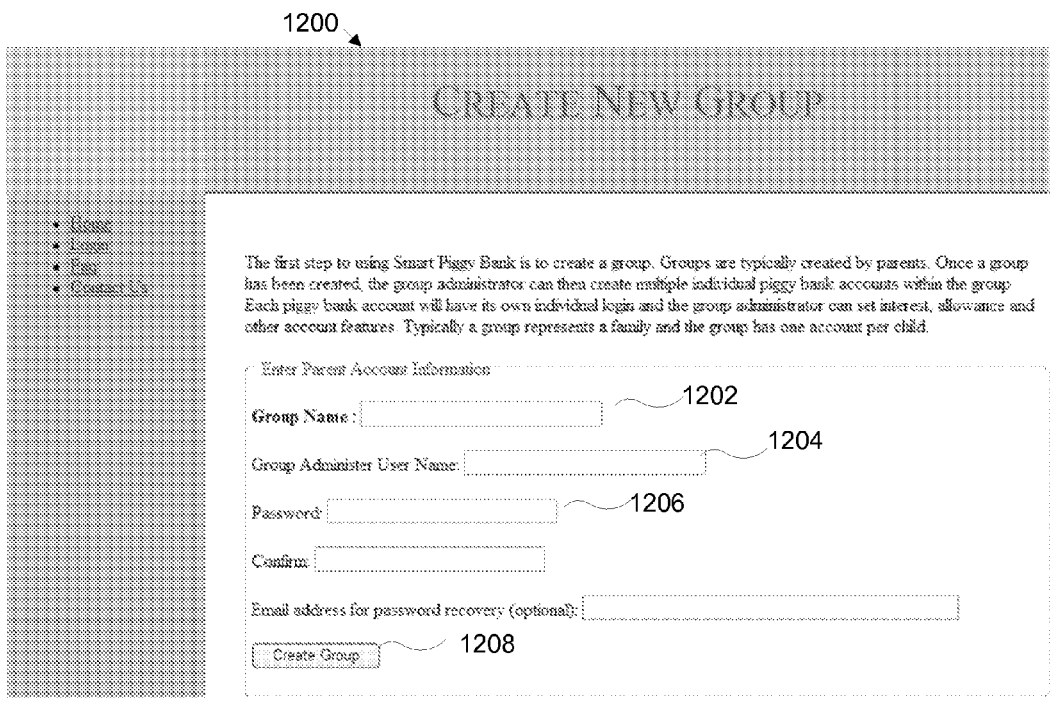
FIG. 12 is an illustration of a graphical user interface of a "Group Creation Page" used in accordance with an embodiment of the present invention.

FIG. 3 shows a flowchart of the method for an embodiment of the present invention. This flow chart is more detailed than FIG. 2. The server 212 generates a "Start Page" (step 302) an embodiment of which is shown in FIG. 11. The system then determines if client request is to create a new group (step 304). If the client wants to create a new group, the system generates a "Group Creation Page" (step 402 of FIG. 4) an embodiment of which is shown in FIG. 12.

If the client did not request to create a new group, the system then determines if the client request is to login (step 306). In an embodiment of the invention, if a client wishes to login, the system will receive login details, such as group name, user name, and password (step 308). The system then determines based on the login details such as group name and user name if the client is an administrator (step 310) by looking in the database 206 records for this group.

Figure 13:
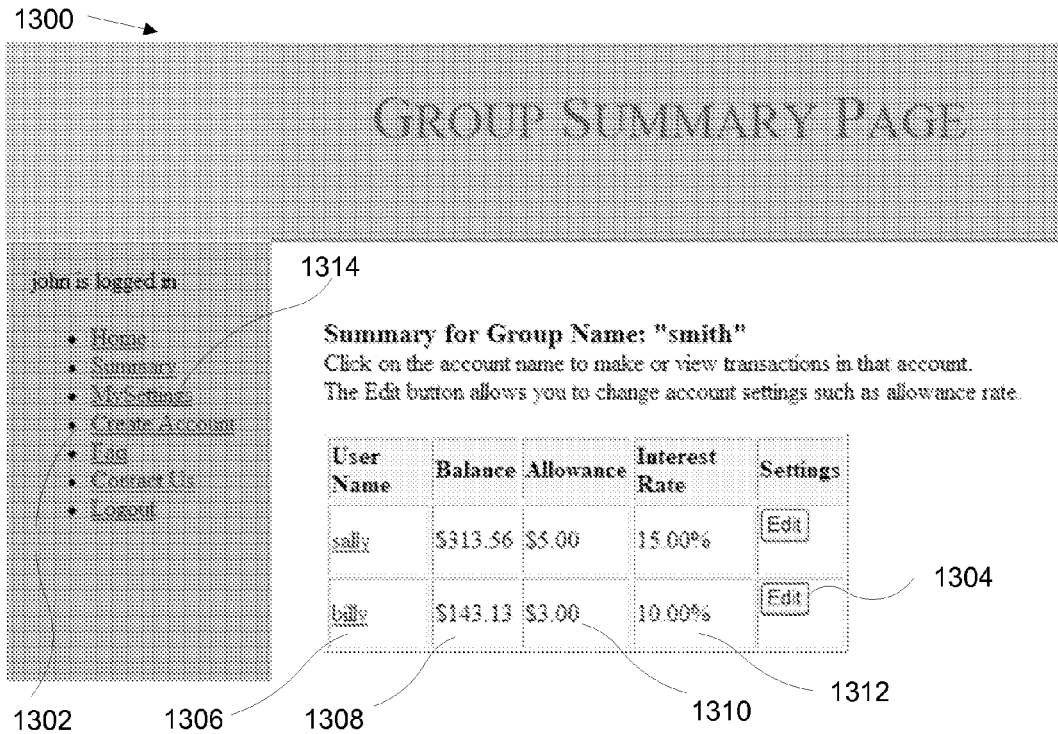
FIG. 13 is an illustration of a graphical user interface of a "Group Summary Page" used in accordance with an embodiment of the present invention.

If the client is an administrator, the system will call "update account" for each account in the administrators group (step 314). FIG. 8 shows a further detailed flow chart for an embodiment of the "update account" process, and the update account process is discussed in the description of FIG. 8. The system then generates a "Group Summary Page" (step 502 of FIG. 5) an embodiment of which is shown in FIG. 13. If the system determines the client is not an administrator and is thus a user (step 310), the system will update the account for the user (step 312). Again, FIG. 8 shows an embodiment of the update account process. It should be noted while in the embodiment described here there is one account per user, in alternate embodiments, there maybe more than one account per user, and in that case all accounts corresponding to that users would have to be brought up to date. The system then generates an "Account Summary Page" (step 702 of FIG. 7) an embodiment of which is shown in FIG. 17.

Figure 4:
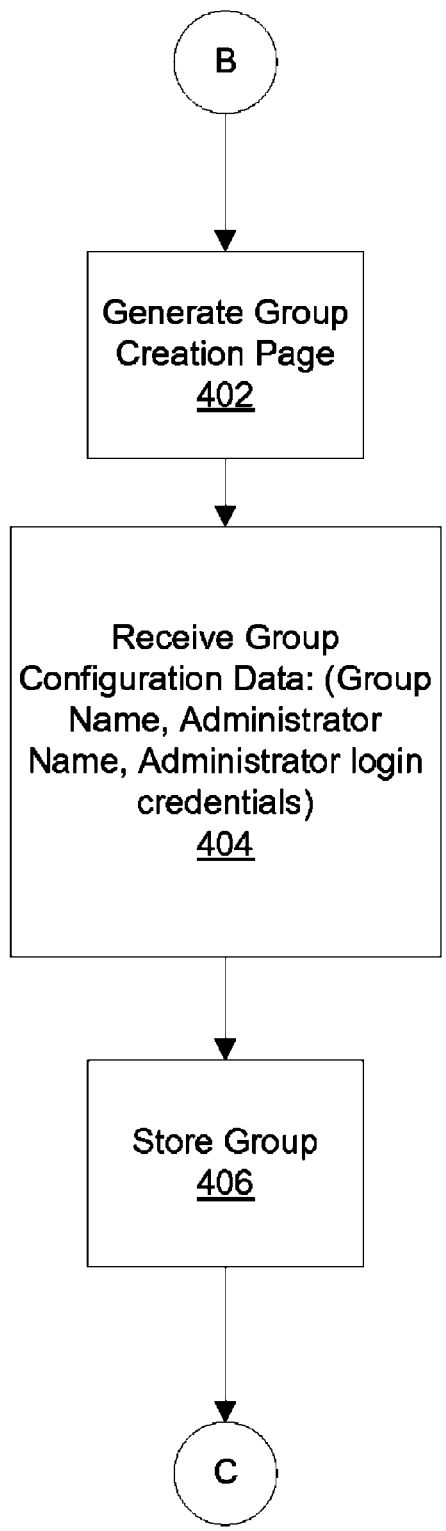
FIG. 4 is continuation of the flow chart of FIG. 3.
Figure 10:
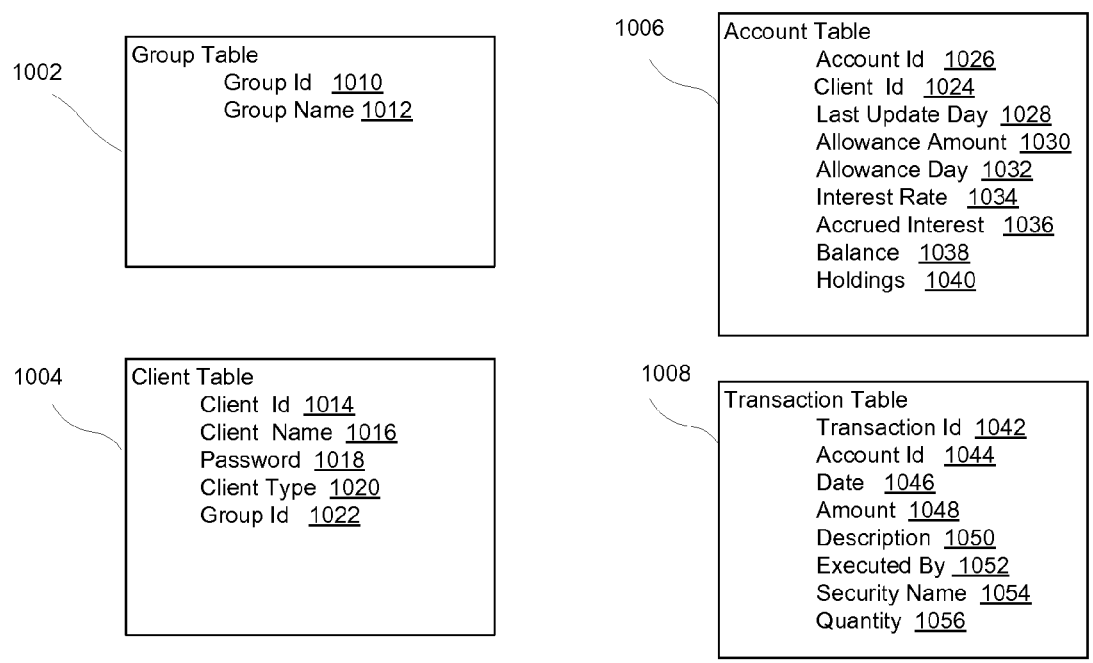
FIG. 10 shows a database data model for an embodiment of the present invention.

FIG. 4 is a continuation of the flow chart of FIG. 3 which shows the process of creating a group. The system generates a "Group Creation Page" (step 402 of FIG. 4) an embodiment of which is shown in FIG. 12 which prompts the administrator to provide group configuration information that includes group name, administrator's login credentials (username, password). The system then receives the group configuration data (step 404). The configuration data is stored (step 406) in the database 206 records. An embodiment of the database schema is shown in FIG. 10. When a new group is stored, the group table 1002 is updated to create a new group record in the group table 1002. The Group Id 1010 is set to a unique integer for the group, and the Group Name 1012 is set based on the group name received in the group configuration data. Also the Client Table 1004 is updated to create a new client record. In the client record, the Client Id field 1014 is set to a new unique integer for the client, the Client Type field 1020 is set to "administrator", Group Id field 1022 is set to same integer as the Group Id field in the Group record thereby linking or relating the records, and the remaining fields of the client record such as Client Name field 1016 and Password field 1018 are completed based on the configuration data.

Figure 5:
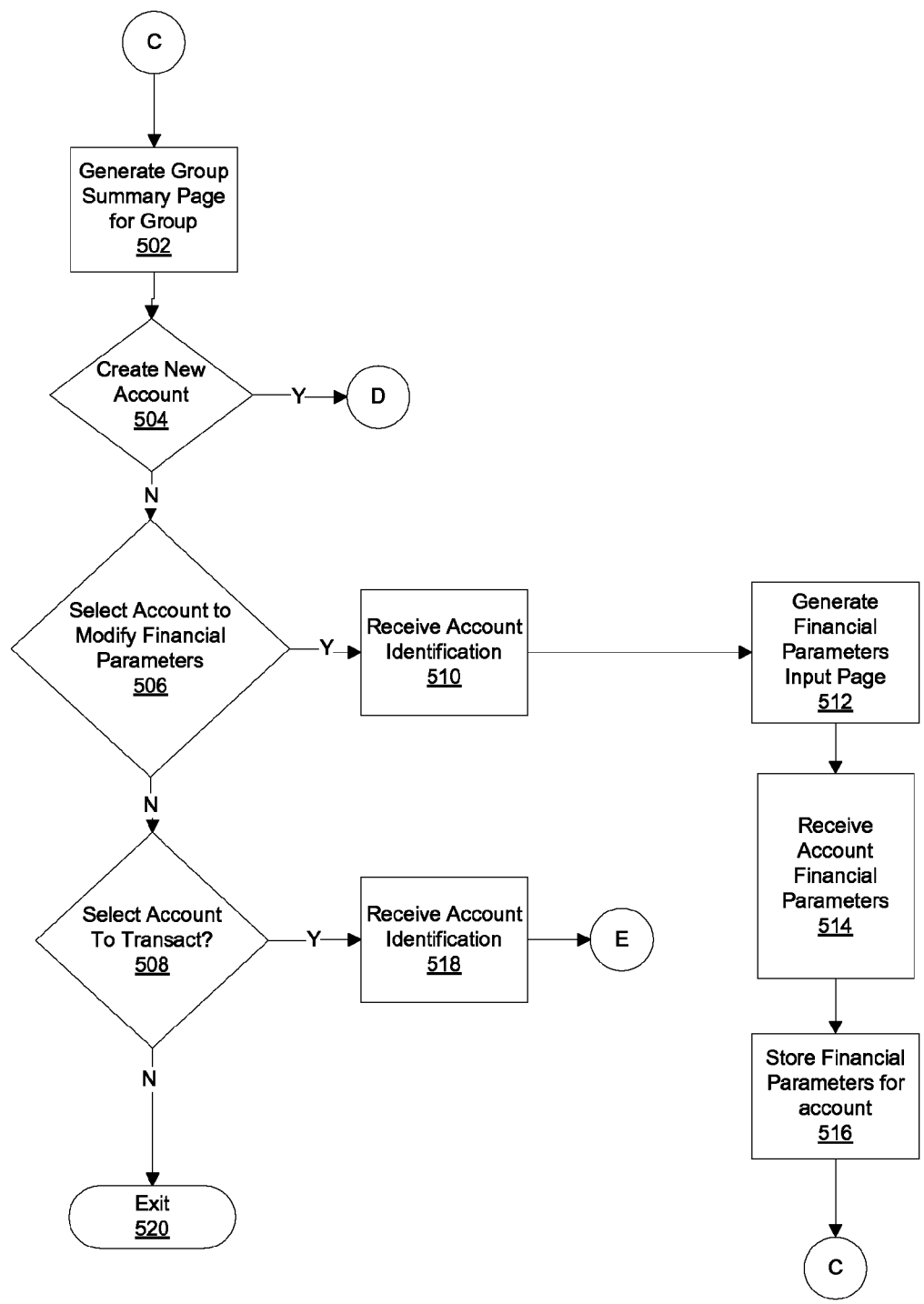
FIG. 5 is a continuation of the flow chart of FIG. 3.

FIG. 5 is a continuation of the flow chart of FIG. 3. Prior to reaching step 502 the system has already determined the client is an administrator, and the section of the flow chart shown in FIG. 5 provides administrative options. In step 502, the system then generates a "Group Summary Page" an embodiment of which is shown in FIG. 13. This page shows the administrator status of the group and prompts the administrator actions including: create account, modify financial parameters of an account, transact an account, or exit.

Figure 6:
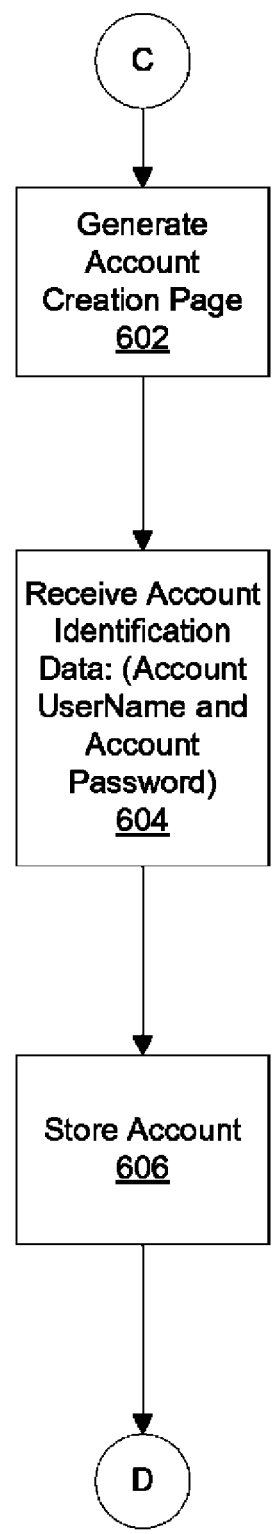
FIG. 6 is a continuation of the flow chart of FIG. 3.
Figure 15:
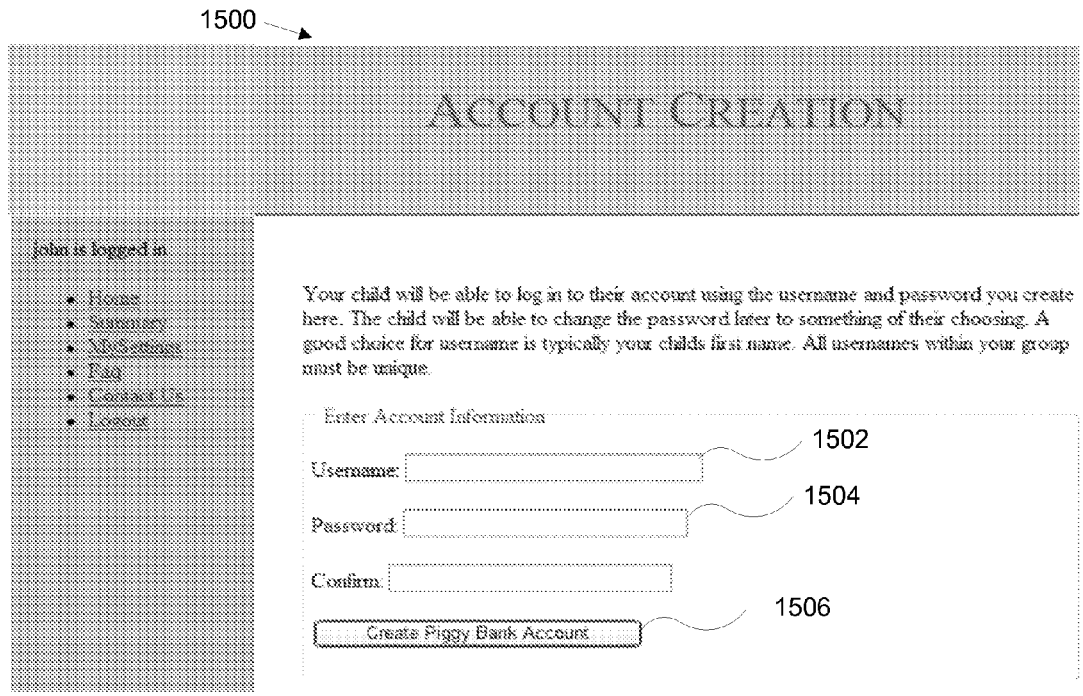
FIG. 15 is an illustration of a graphical user interface of a "Account Creation Page" used in accordance with an embodiment of the present invention.

If the administrator requests to create a new account (step 504), the system generates an "Account Creation Page" (step 602 of FIG. 6). An embodiment of "Account Creation Page" is shown in FIG. 15. The account creation section of the flow chart is described later as part of the description of FIG. 6.

Figure 14:
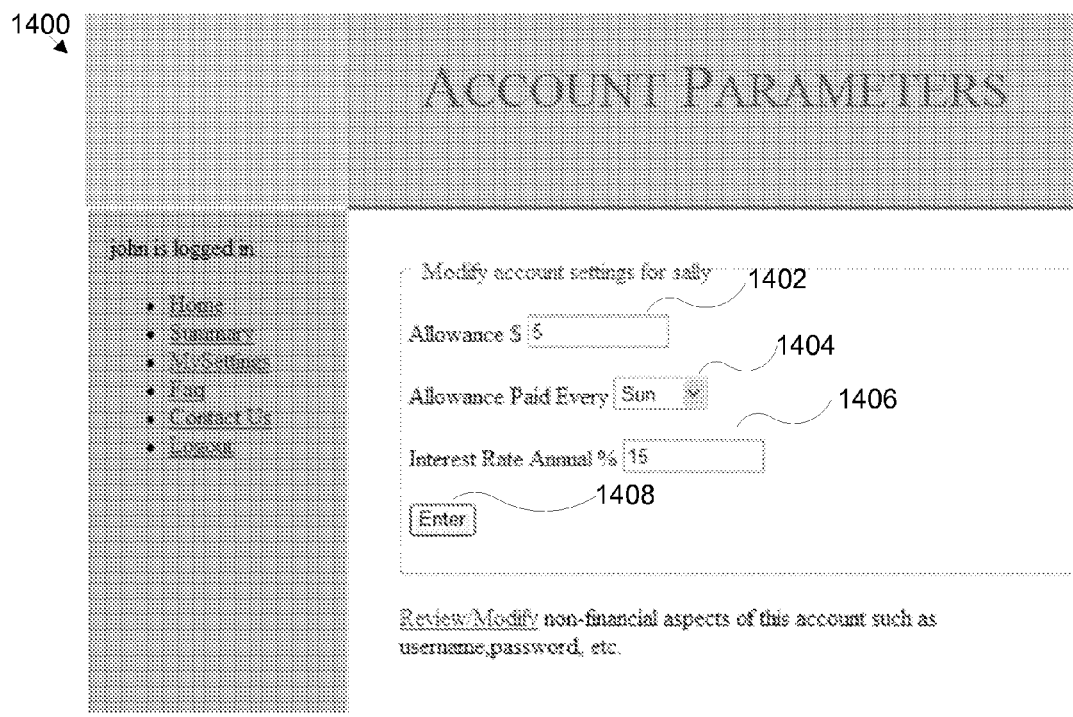
FIG. 14 is an illustration of a graphical user interface of a "Financial Parameters Input Page" used in accordance with an embodiment of the present invention.

If the administrator requests to modify account financial parameters (step 506), the account identification is received (step 510) and the system generates a "Financial Parameters Input Page" (step 512) corresponding to the selected account. An embodiment of a "Financial Parameters Input Page" is shown in FIG. 14. This page prompts the administrator to enter financial parameters for the account such as interest rates and allowance amounts. The system then receives the financial parameters for the account (step 514). The information is then stored (step 516) in the database 206. Based on the example scheme shown in FIG. 10, the record in the Account Table 1006 corresponding to the received account identification in step 510 is updated. Fields in the record such as Allowance Amount 1030, Allowance Day 1032, and Interest Rate 1034 are updated based on the received financial parameters. It is an important aspect of this invention that the administrator can configure the financial parameters.

If the administrator requests to perform a transaction (step 508), the account identification is received (step 518) and the system generates an "Account Summary Page" (step 702 of FIG. 7) for the selected account. An embodiment of the "Account Summary Page" is shown in FIG. 17. The account transaction section of the flow chart is described later as part of the description of FIG. 7.

Finally, in FIG. 5 the administrator may also request to exit (step 520) which terminates the session for the administrator.

FIG. 6 is a continuation of the flow chart of FIG. 3. Prior to reaching step 602 the system has already determined the client is an administrator that is requesting to create a new account. In step 602, the system then generates an "Account Creation Page" an embodiment of which is shown in FIG. 15. This page prompts the administrator for the information of the new account that includes the user name corresponding to the new account and the password for that user. In this embodiment, the name of the user and the name of the account are identical and there is one account per user. In alternate embodiments there maybe many accounts per user. The system receives the account identification data (step 604). The account data is stored (step 606) in the database 206 records. Based on the schema shown in FIG. 10, the account identification information maybe stored as follows. A new client record is created in the Client Table 1004, the Client Id field 1014 is a new unique client number, the Client Type field 1020 is set to "user", the Client Name field 1016 and Password field 1018 are set from the account identification information received. Thus, the process of creating the account also creates login credentials for the user of the account. In some embodiments the user may alter those login credentials when they log in. The client record's Group Id field 1022 is set to the vale in the Group Id field 1010 of the administrator's group record thereby linking the new user's client record to the administrator's group. A new account record is created in the Account Table 1006 with a unique number set in the Account Id field 1026. The Client Id field 1029 is set to the value of the client record's Client Id field 1014 thereby linking this account to this client. Default values are used for the remaining fields in the account record.

Figure 7:
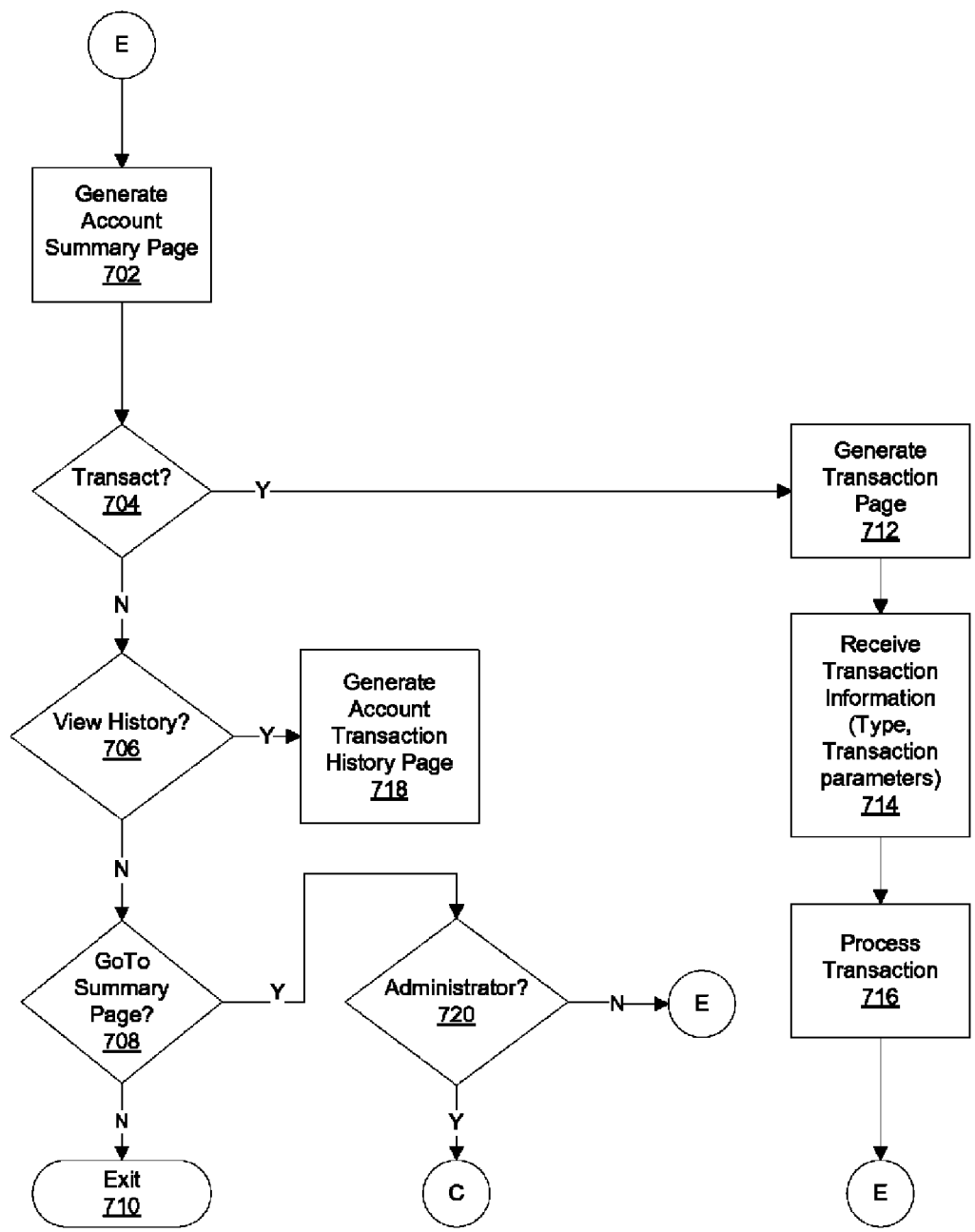
FIG. 7 is a continuation of the flow chart of FIG. 3.
Figure 8:
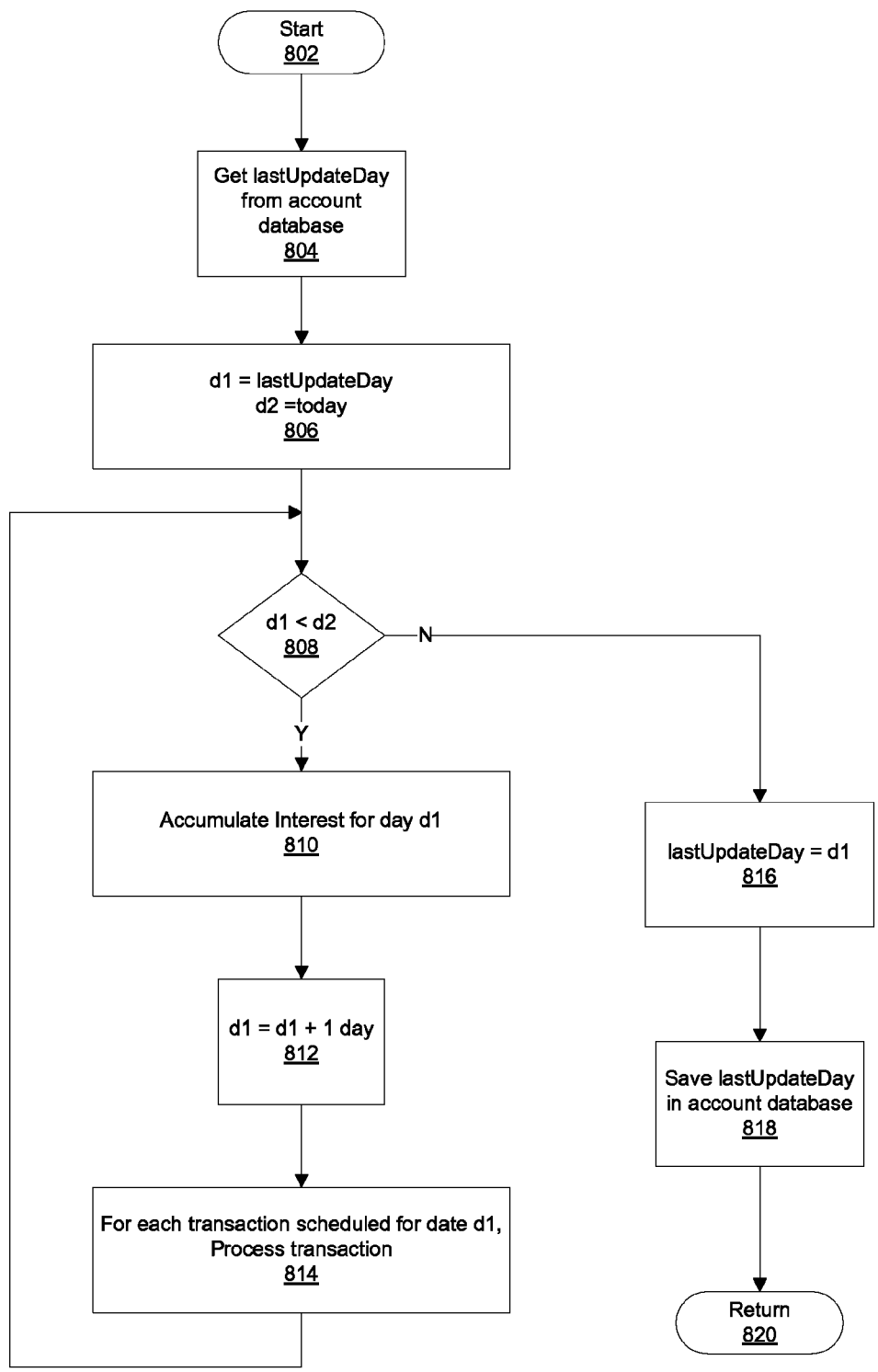
FIG. 8 shows a detailed flow chart for Update Account for an embodiment of the present invention.

FIG. 7 is a continuation of the flow chart of FIG. 3. Prior to reaching step 702, the system has already determined that the client, which may be a user or an administrator at this point, has selected a specific account to view, and the section of the flow chart shown in FIG. 7 provides options for viewing and transacting an account. In step 702, the system generates a "Account Summary Page" an embodiment of which is shown in FIG. 17. This page shows the status of the account including basic information such as current balance 1704, holdings and perhaps the last transactions 1716. The page also prompts the client to for actions including: make a transaction 1712, view history 1714, or exit.

Figure 9:
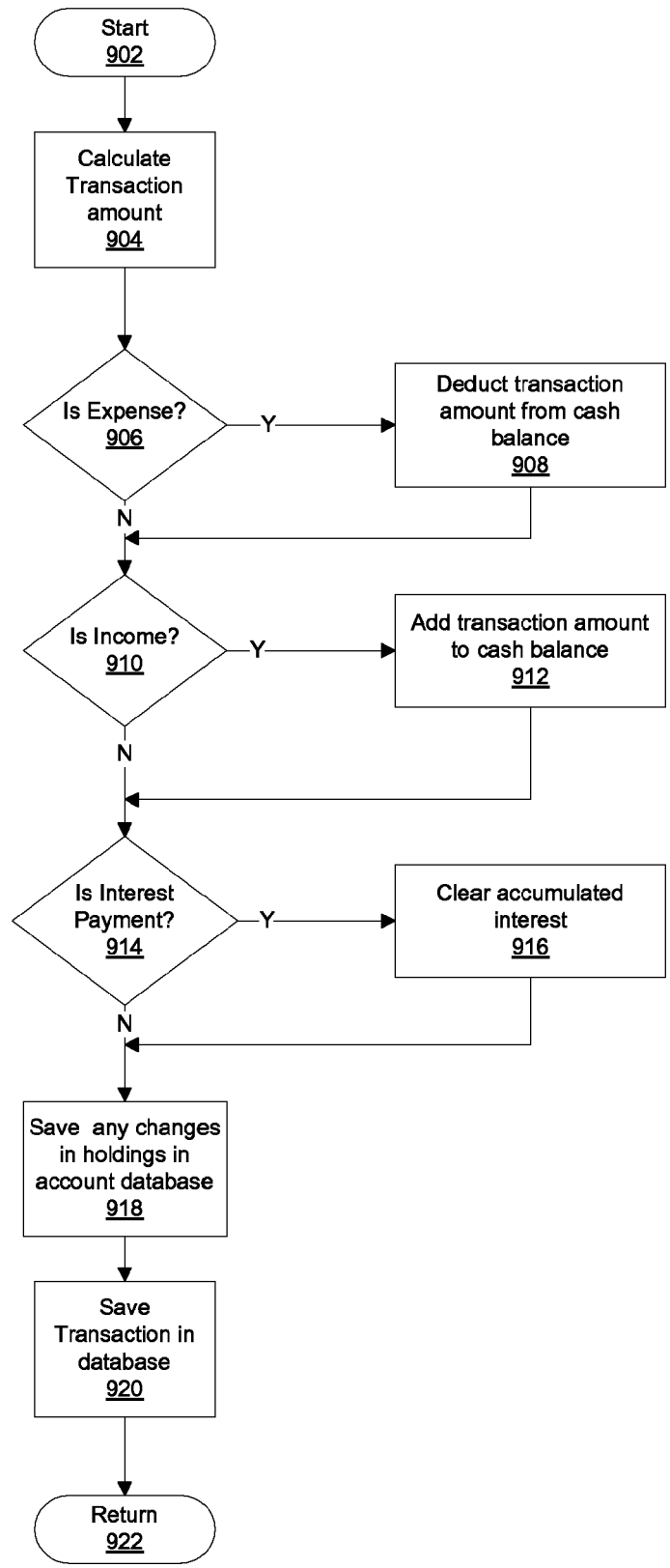
FIG. 9 shows a detailed flow chart for Process Transaction for an embodiment of the present invention.
Figure 16:
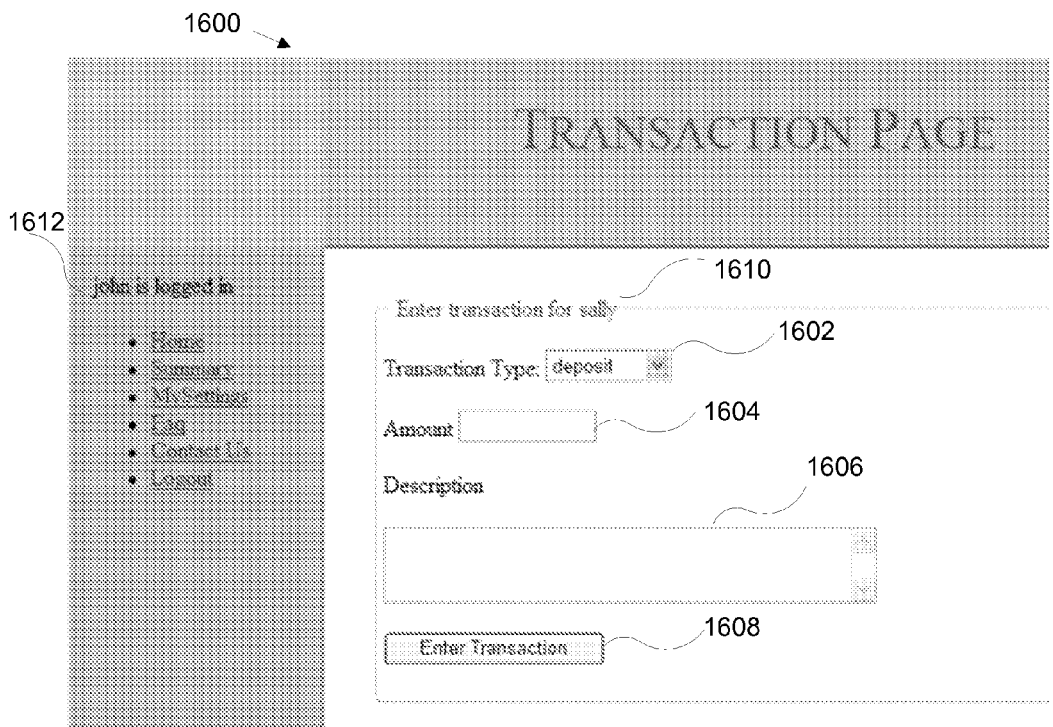
FIG. 16 is an illustration of a graphical user interface of a "Transaction Page" used in accordance with an embodiment of the present invention.

If the client requests to make a transaction (step 704), the system generates a "Transaction Page" (step 712) an embodiment of which is shown in FIG. 16. This page prompts the client to enter the information for the transaction. The transaction type could include deposit, withdrawal, buy, sell, etc. Based on the type of transaction the parameters such as amount and description are prompted. The system then receives the transaction information (step 714). The transaction is then processed (step 716). FIG. 9 shows a further detailed flow chart for an embodiment of processing the transaction and is discussed in the description of FIG. 9.

If the client requests to view history (step 706), the system generates an "Account Transaction History Page" (step 718) which may show past transactions and provide capability to search past transactions for this account.

If the client requests to see summary page (step 708), the system then determines whether the client is an administrator (step 720). If the client is an administrator, the system generates a "Group Summary Page" (step 502 of FIG. 5). If the client is not an administrator, it generates the "Account Summary Page" (step 702).

Finally, in FIG. 7, the client may also request to exit (step 710) which terminates the session for the client.

FIG. 8 shows a more detailed flow chart for update account process which is called in steps 312 and 314 of FIG. 3. The objective of update account is to make sure the account information is up to date prior to being viewed. The system needs to make sure interest has been paid, dividends have been paid, and automated transactions such as allowance have been recorded since the last time the account was accessed. In one embodiment, there is a process that runs at set periods of time to update the account. In this embodiment, the account is updated every time a client tries to access it. The process starts with step 802 which marks start and the input is the account id to be updated. The time of last account update is retrieved from the database (step 804). Using the schema of FIG. 10, this would entail retrieving the Last Update Day field 1028 from the Account record in the Account Table 1006 corresponding to the Account Id being updated. Temporary variable d1 is set to the last update day and variable d2 is set to the current day (step 806). If d1<d2 (step 808), then we accumulate interest for day d1 (step 810). This step involves taking the current balance and multiplying by the daily interest rate and adding it to any already accumulated interest. That accumulated interest is then stored in the Accrued Interest field 1036 of the account record in the database. Note it is important that the accumulated or accrued interest has not yet been paid to the user in the form of a transaction. The idea is that interest can accumulate for example on a daily basis but be paid on a different basis say monthly. We then increment to the next day (step 812) by adding one day to d1. Then check for day d1 if there are any scheduled transactions date d1. Those transactions might include allowance payments, dividends, monthly interest payments, etc. We determine what transactions need processing by examining the account record for this account which shows the account holdings 1040 and allowance day 1032. We process all transactions for data d1 (step 814). FIG. 9 shows a further detailed flow chart for an embodiment of processing the transaction and is discussed in the description of FIG. 9. The system now loops back to step 808 to check if d1<d2.

If in date check step 808, d1 is equal to or greater than d2, this means we have processed all of the pending transactions and brought the account up to date. Next, set last update day to the current value of d1 (step 816) and save that in the database (step 818). Using the Schema of FIG. 10, this involves updating the Last Update Day field 1028 of the Account Table 1006 record corresponding to this account. Thus next time the account is accessed, the system will not reprocess the transactions for days that it already has. The processing of updating the account then returns (step 820).

FIG. 9 shows a more detailed flow chart for processing a transaction which is called in steps 716 of FIGS. 7 and 814 of FIG. 8. Step 902 is the start of the process. The inputs are the transaction information (step 714). The transaction information may include a transaction type such as deposit, withdrawal, buy, sell, etc. If the transaction is a deposit or withdrawal it will include the amount. If the transaction is a buy or sell, it will include investment instrument identification along with a quantity. The amount of the transaction is calculated in step 904. If the transaction is a deposit or withdrawal the amount will be provided as input. If the transaction is a buy or sell, the amount will be calculated by taking the quantity and multiplying the quantity by the current price. The price maybe provided as an input or looked up on an exchange such as stock price.

The system then determines if the transaction is an expense (step 906) such as a withdrawal or purchase of an investment instrument. If a transaction is an expense the amount is deducted from the Balance field 1038 of the account record (step 908). If the transaction is income such as a deposit or sale of a investment instrument (step 910), the amount is added to the Balance field of the account record (step 912). The system then determines if the transaction is a payment of accumulated interest (step 914). If the transaction is an accumulated interest payment, then the system clears the accumulated interest (step 916). Using the Schema of FIG. 10, this involves setting the Accrued Interest field 1036 of the account record to zero.

Any changes to the account holdings are then recorded in the database 206 (step 918). In one embodiment the holdings are stored in the Holdings field 1040 of the account record. The holdings may list investment instruments by identification and amount held. When investment instruments are bought or sold, that information is updated. A record of the transaction is then recorded in the database 206 (step 920). In one embodiment, this involves creating a new transaction record in the Transaction Table 1008. The transaction record will have a unique Transaction Id 1042. The Account Id field 1044 is set to the account that this transaction was made on. The Date field 1046 is set to the date of the transaction. The Amount field 1048 is set to the amount of the transaction. The Description field 1050 is filled with a text description of the transaction which maybe provided by the client or generated by the system if the transaction is automated such as an interest or allowance payment. The Executed By field 1052 is set to the Client Id of the client executing the transaction or set to a field indicating it was an automated transaction. The Security Name field 1054 is set to the name, symbol or security Id of the investment instrument being bought or sold. The Quantity field 1056 is set to the number of shares or quantity of investment instrument being transacted. Alternative embodiments may include other fields in the transaction record such as price, transaction fee, etc. The processing of the transaction then returns (step 922).

FIG. 10 shows a database scheme used in accordance with an embodiment of this invention. This schema includes four tables: the Group Table 1002, the Client Table 1004, the Account Table 1006 and the Transaction Table 1008. Many alternate database schema, data models, and database implementations of this invention are possible. FIG. 10 is but one example.

The Group Table 1002 contains the Group Id field 1010 which is a unique number for each group record. The Group Name field 1012 contains the name of the group. The name of the group is text and is set by the administrator. One convention some administrators use when administering a family's finances is to set the group name to the last name of the family and the client names to the first name of the family members.

The Client Table contains the Client Id field 1014 which is a unique number corresponding to the client record. The Client Name field 1016 contains the name of the client. The Password field 1018 contains the password for the client. The Client Type field is set to "administrator" or "user" depending on the type of client. The Group Id field 1022 is a cross reference to group records in the Group Table 1002 and links a client to a group.

The Account Table 1006 contains the Account Id field 1026 which is a unique number corresponding to the account record. The Client Id field 1024 is a cross reference to client records in the Client Table 1004 and links an account to a client. The Last Update Day field 1028 contains the date that the account was last accessed and is used to make sure the accounts transactions are kept up-to-date (see FIG. 8). The Allowance Amount field 1030 contains the amount of allowance that the user gets. The Allowance Day 1032 field sets the day of week or month that allowance is paid on. The Interest Rate field 1034 sets the annualized interest rate. In this embodiment the interest is default accumulated daily and paid monthly although other embodiments could have different options. Fields such as Allowance Amount, Allowance Day, and Interest Rate are considered financial parameters of the account and in most embodiments are only settable by the administrator. The Balance field 1038 contains the cash balance of the account. The Holdings field 1040 contains a list of investment instruments including identification such as symbol and a quantity of the instruments held.

The Transaction Table 1008 contains the Transaction Id filed 1042 which is a unique number corresponding to the transaction record. The Account Id field 1044 is a cross reference to account records in the Account Table 1006 and links a transaction to an account. The Date field 1046 is the date of a transaction. The Amount field 1048 is the amount of a transaction. The Description field 1050 is a text description of the transaction. The Executed By field 1052 is a cross reference to the client that executed the transaction or is an indicator that the transaction was automated such as interest payment. Security Name field 1054 is the investment instrument involved in the transaction and maybe a symbol or other identification. The Quantity field 1056 is the quantity of the investment instrument involved in the transaction.

FIG. 11 is an illustration of a graphical user interface of "Start Page" 1100 used in accordance with an embodiment of the invention. If the client already has an account, the client would click on the "Log me in" button 1102 which will then prompt the user to enter login credentials such as group name, user name and password. A new client would click on the "To get started create a group" button 1104 and would be taken to the create group page an embodiment of which is shown in FIG. 12.

FIG. 12 is an illustration of the "Group Creation Page" 1200 used in accordance with an embodiment of the invention. Details such as "Group Name" 1202, "Group Administer User Name" 1204, and Group Administrator "Password" 1206 are entered into the fields on the page. By clicking the "Create Group" button 1208, the administrator submits the group information to the system (step 404 of FIG. 4).

FIG. 13 is an illustration of a graphical user interface of "Group Summary Page" 1300 used in accordance with an embodiment of the invention. This page is displayed to administrators when they log in (step 502 FIG. 5). Administrators may click on "Create Account" link 1302 to create an additional account in the group. The group summary page displays for each account in the group the following: the account name 1306, the account balance 1308, the allowance amount 1310, and the account interest rate 1312. The administrator may click on the user name link 1306 to view and transact on that account. The administrator may also click on the "edit" button for the account 1304 which will display to the administrator the "Financial Parameters Input Page" for that account. An embodiment of the "Financial Parameters Input Page" is shown in FIG. 14. Finally, the administrator can change account settings such as password by clicking on "My Settings" 1314.

FIG. 14 is an illustration of a graphical user interface of "Financial Parameters Input Page" 1400 used in accordance with an embodiment of the invention. The account financial parameters such as allowance amount 1402, day of the week or month to pay allowance 1404, interest rate 1406 are entered into the fields on the page. By clicking the "Enter" button 1408, the administrator submits the financial information for the account to the system (step 514 FIG. 5).

FIG. 15 is an illustration of the "Account Creation Page" 1500 used in accordance with an embodiment of the invention. This page is presented to an administrator that has requested to create an account. Details such as user name for the account 1502 and password for the account 1504 are entered into the fields on the page. By clicking "Create Piggy Bank Account" button 1506, the administrator submits the account information to the system (step 604 of FIG. 6).

FIG. 16 is an illustration of the "Transaction Page" 1600 used in accordance with an embodiment of the invention. To get to this page the client has already selected an account to transact. The Client user name 1612 is displayed, in this example it is John. The account name is also displayed 1610, in this case it is the account for sally. In this example, John is that administrator performing a transaction on Sally's account. The client enters the details of the transaction such as Transaction Type 1602, Amount 1604 and Description 1606 into the fields on the page. This is a fairly simple transaction page for deposits and withdrawals. More complex pages are possible for buying and selling investment instruments using additional fields. By clicking the "Enter Transaction" button 1608, the client submits the transaction information to the system (step 714 of FIG. 7).

FIG. 17 is an illustration of a graphical user interface of "Account Summary Page" 1700 used in accordance with an embodiment of the invention. This page is displayed to users when they log in or administrators that select a specific account to view (step 702 FIG. 7). The name of the client currently viewing the account is displayed 1718. The account user name is displayed 1702. Note that if the client logged in was an administrator the client user name 1718 and account user name 1720 would differ. In this example, the client sally is the user viewing her account. The account balance 1704, current accrued interest 1706, the weekly allowance 1708 and annual interest rate 1710 for the account are displayed. There is a table showing the last ten transactions 1716. In the table 1716, each transaction shows the date, type, amount and description. The client may click on the "Make a transaction on this account" button 1712 which will take the client to the transaction page, an embodiment of which is shown in FIG. 16. If the client is an administrator and clicks on the "Summary" link 1720, the system will generate a group summary page, an embodiment of which is shown in FIG. 13.

The client may also click on the link "search all transactions" 1714 that will generate a web page allowing a search of the transaction history.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for administering finances for instructional purposes via an electronic network, the method comprising:
  receiving account identification information for a user account from an administrator wherein said administrator is a teaching entity not affiliated with a bank or any other financial institution authorized by a government;
  storing account record for said user account;
  receiving financial parameters for said user account from said administrator via said electronic network wherein said financial parameters, set at the discretion of said administrator without being constrained by prevailing market conditions, include an interest rate;
  storing said financial parameters for said user account;
  receiving transaction information for said user account;
  updating account holdings and cash balance of said user account based on said financial parameters to reflect all said transactions; and
  reporting said user account holdings.

2. The method of claim 1, wherein said updating said account holdings includes accruing interest at a rate specified by said financial parameters and further comprises adding accrued interest to account balance and recording a interest payment transaction at dates specified by said financial parameters.

3. The method of claim 1, wherein said financial parameters include an amount for a recurring allowance payment.

4. The method of claim 3, wherein said financial parameters include a day of the week for said allowance amount to be recorded as paid to said user on a weekly basis.

5. The method of claim 1, wherein said financial parameters include the specification of a fixed income security that said user may purchase wherein said specification parameters of said fixed income security are set at the discretion of said administrator and include price, duration and coupon schedule.

6. The method of claim 1, wherein said transaction information includes buying and selling of investment instruments whose value tracks publically traded investment vehicles whose value is quoted on exchanges.

7. The method of claim 1, wherein said account holdings include investment instruments whose value tracks publically traded investment vehicles whose value is quoted on exchanges.

8. The method of claim 1, wherein said account holdings include investment instruments whose value and dividends tracks a mutual fund.

9. The method of claim 1, wherein said updating said account holdings includes calculating the current value of said account holdings based on market value of securities that said holdings track.

10. The method of claim 1, wherein said updating said account holdings includes processing scheduled transactions.

11. The method of claim 10, wherein said scheduled transactions include an allowance.

12. The method of claim 10, wherein said scheduled transactions is a dividend calculated based on the dividend of the investment instrument that said account holding is tracking.

13. The method of claim 1, further comprising reporting said transaction history.

14. A method for administering finances for instructional purposes via an electronic network, the method comprising:
receiving account identification information for a user account from an administrator wherein said administrator is a teaching entity not affiliated with a bank or any other financial institution authorized by a government and said account identification information includes a user name and default password for said user;
storing account record for said user account;
receiving financial parameters for said user account from said administrator via said electronic network wherein said financial parameters, set at the discretion of said administrator without being constrained by prevailing market conditions, include an interest rate, an allowance amount and a day of the week for said allowance amount to be recorded as paid to said user on a weekly basis;
storing said financial parameters for said user account;
receiving transaction information for said user account;
updating cash balance of said user account based on said financial parameters to reflect all said transactions; and
reporting said use account holdings.

15. A method of claim 14, further comprising receiving group configuration data from said administrator where said group configuration data includes a group name and wherein said account identification information for said user from said administrator includes a said group name.

* * * * *